United States Patent [19]
Ackermann

[11] 3,875,490
[45] Apr. 1, 1975

[54] BATTERY CHARGING EQUIPMENT HAVING A VOLTAGE DIVIDER INCLUDING A CAPACITOR AND TRANSISTOR

[75] Inventor: Karl Ackermann, Berlin, Germany

[73] Assignee: Robert Bosch Photokino GmbH, Stuttgart, Germany

[22] Filed: Apr. 16, 1974

[21] Appl. No.: 461,386

[30] Foreign Application Priority Data
May 23, 1973 Germany............................ 2326105

[52] U.S. Cl............. 320/40, 320/DIG. 2, 323/22 SC
[51] Int. Cl............................................... H02j 7/10
[58] Field of Search...... 320/35, 36, 39, 40, DIG. 2; 323/22 SC

[56] References Cited
UNITED STATES PATENTS

| 3,543,127 | 11/1970 | Fry et al. | 320/35 X |
| 3,733,535 | 5/1973 | Ballman | 320/DIG. 2 |
| 3,781,632 | 12/1973 | Charboneau | 320/DIG. 2 |

*Primary Examiner*—J. D. Miller
*Assistant Examiner*—Robert J. Hickey
*Attorney, Agent, or Firm*—Michael S. Striker

[57] ABSTRACT

A full-wave rectifier connected to an AC source supplies a pulsating DC voltage. A thyristor is interconnected between the output of the rectifier and the battery. A voltage divider including a capacitor and the emitter-collector circuit of a transistor is connected across the output of the rectifier. The voltage divider has tap connected to the gate of the thyristor. A voltage proportional to the battery voltage is applied to the base of the transistor. Variations in the emitter-collector resistance of the transistor, which correspond to changes in the battery output voltage determine the cut-in time of the thyristor. When the battery voltage is sufficiently high the thyristor blocks completely.

5 Claims, 1 Drawing Figure

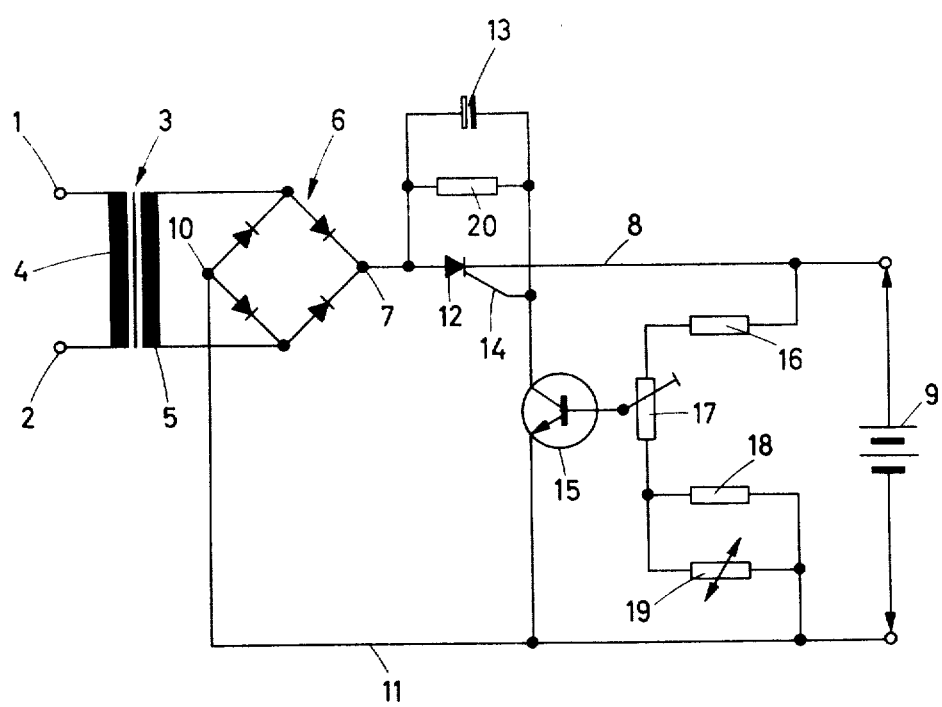

BATTERY CHARGING EQUIPMENT HAVING A VOLTAGE DIVIDER INCLUDING A CAPACITOR AND TRANSISTOR

BACKGROUND OF THE INVENTION

The present invention relates to battery charging equipment. In particular, it relates to battery charging equipment wherein an AC voltage source is used to charge the battery through a rectifier. Further, an electronic switch is utilized which interrupts the charging current when the battery is fully charged. The interruption of charging current is timed by the signal applied to the control electrode of the electronic switch. This signal is a signal proportional to the battery voltage.

There are a number of well known systems which function as described above. In a number of them the electronic switch is a thyristor which is driven in half-wave cycles, that is, it is conductive for every half-wave of the AC voltage which is of the proper polarity relative to its direction of conduction. In conventional equipment the voltage at the gate of the thyristor is derived from a voltage divider which has at least one resistance and further has an additional thyristor. The voltage applied to the gate of the additional thyristor is a voltage proportional to the then present battery voltage. As soon as the voltage across the battery has reached the desired voltage, the thyristor which forms part of the voltage divider becomes conductive and a current flows over its anode-cathode circuit which in turn results in a higher voltage drop across the ohmic resistance. The higher voltage drop across the ohmic resistance in the voltage divider causes the first thyristor to block and the charging current to the battery to interrupted.

In the above-described conventional equipment the danger exists that the charging process is interrupted before the battery has been charged to anywhere near the desired voltage. This results from the fact that an AC ripple voltage is superimposed over the DC voltage at the output of the rectifier. The size of the AC component depends upon the charging current whose amplitude in turn depends upon the line voltage existing at the particular instant. This is unfortunately subject to rather large variations. Thus care must be taken that the electronic switch which interrupts the charging process does not respond to the average value consisting of the battery voltage and the superimposed AC ripple voltage, but reacts only to the actual value of the battery voltage.

SUMMARY OF THE INVENTION

It is an object of the present invention to provide battery charging equipment which is simple in construction, utilizes few parts and at the same time is very reliable and exact even under conditions of large line voltage variations.

The present invention resides in equipment for charging a battery from an AC source furnishing an AC voltage, said equipment having rectifier means for rectifying said AC voltage and furnishing a corresponding pulsating DC voltage. The equipment further has electronic switch means having a control electrode, interconnected between said rectifier means and said battery for interrupting the charging current to said battery in response to a cutoff signal at said control electrode. The invention comprises a voltage divider connected to the output of said rectifier means and having a voltage divider tap connected to said control electrode of said electronic switch means. The voltage divider comprises a reactive circuit element and a variable impedance element having an impedance control electrode, the impedance of said variable impedance element varying as a function of the signal applied to said impedance control electrode. Additional circuit means interconnected between the impedance control electrode and the battery furnish a signal to said impedance control electrode which corresponds to the battery output voltage.

In a preferred embodiment of the present invention, the voltage divider connected to the output of the rectifier means comprises a capacitor and the emitter-collector circuit of a transistor whose gate is controlled by a DC voltage proportional to said battery voltage.

In order to accomplish that the equipment restarts itself, that it again becomes responsive to a drop in battery voltage after a fully charged state has once been reached, a resistor is connected in parallel with the above-mentioned capacitor.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

The single FIGURE is a circuit diagram of the present invention.

DESCRIPTION OF THE PREFERRED EMBODIMENT

A preferred embodiment of the present invention will now be described with reference to the drawing.

In the FIGURE, reference numerals 1 and 2 refer to the terminals of a plug which is insertable into the outlet to receive the AC voltage. The AC voltage is applied to the primary 4 of a transformer 3 whose secondary winding 5 has a full-wave bridge rectifier 6 connected in parallel therewith. The output terminals of the full-wave rectifier are labelled 7 and 10 respectively. It is at these terminals that the pulsating DC voltage appears. A thyristor 12 has an anode connected to terminal 7, a cathode connected to a line 8 whose other extremety is connected to the first output terminal, and a gate 14. Connected from terminal 7 to gate 14 is a parallel circuit comprising a capacitor 13, a preferred embodiment of a reactive impedance element, and a resistor 20. Gate 14 is also connected to the emitter-collector circuit of a transistor 15. Specifically, the collector of transistor 15 is connected to gate 14, while its emitter is connected through a line 11 to terminal 10, namely the second output terminal of the bridge rectifier. Further, the emitter of transistor 15 is also connected to the second output terminal. A battery 9 is connected from the first to the second output terminal.

Capacitor 14 and the emitter-collector circuit of transistor 15 constitute the first voltage divider, while a second voltage divider comprising a resistor 16, a potentiometer 17, and a parallel circuit including a resistor 18 and a negative temperature coefficient resistor 19, is connected in parallel with battery 9. Thyristor 12 is herein referred to as electronic switch means, while transistor 15 constitutes a variable impedance element.

The above-described circuit operates as follows:

The AC component of the pulsating DC voltage at terminal 7 is applied to gate 14 of thyristor 12 by capacitor 13. Thyristor 12 thus becomes conductive for each positive AC half-wave as soon as the required ignition voltage exists at gate 14. When the pulsating voltage passes through the zero point, the thyristor reverts to the blocked condition. The voltage existing at the cathode of thyristor 12 is the battery voltage with the charging voltage supplied by rectifier 6 superimposed thereon. The actual magnitude of the AC component of the voltage at the cathode of thyristor 12 depends upon the no load voltage of battery 9 as well as the charging voltage applied to the battery.

As previously stated, the collector-emitter circuit of transistor 15 and capacitor 13 form a voltage divider for the voltage applied to gate 14 of thyristor 12. As long as transistor 15 is blocked, the AC component is applied full strength to the gate of thyristor 12. When however a signal is applied to the base of transistor 15 which changes the resistance value of the emitter-collector circuit, the signal applied to the base of gate 14 is phase shifted relative to the output signal of the rectifier and the angle of conduction of the thyristor is changed. When the phase shift reaches 90°, the thyristor is completely blocked. The resistivity or total ohmic resistance of the emitter-collector circuit of transistor 15 is controlled by the voltage applied to its base. Thus the total ohmic resistance of the emitter-collector circuit of transistor 15 which determines the cut-in phase of thyristor 12 depends only on the no-load voltage of battery 9. This is of course because prior to cut-in of thyristor 12 no current flows on line 8 and the voltage across the voltage divider having components 16–19 depend solely on the no-load voltage of battery 9 at that time. Thus as the no-load voltage of the battery increases, the resistance of the emitter-collector circuit of transistor 15 decreases causing the voltage at gate 14 to decrease correspondingly. The cut-in phase for ignition of thyristor 12 starts before the peak of the voltage at terminal 7 is reached. As the no-load voltage of the battery increases, the cut-in phase gets translated further and further towards the peak. If at this point the voltage at gate 14 has decreased sufficiently that it is less than the required ignition voltage, thyristor 12 remains blocked. This causes capacitor 13 to charge to the maximum voltage of the positive half-wave of the applied AC signal. No further AC signal can reach gate 14 so that thyristor 12 remains in the blocked condition. This condition does not change even when the no-load voltage for battery again drops so that the emitter-collector circuit of transistor 15 again has sufficiently high resistance. The circuit without resistor 20 can only be reactivated by removing it from the AC source. A short removal causes the circuit to become operative again since one AC pulse is sufficient to ignite thyristor 12 and thus discharge capacitor 13.

However, it would be more desirable to let the circuit reactivate itself automatically as soon as the no-load voltage of battery 9 has reached a predetermined low value. For this purpose resistor 20 is furnished which is connected in parallel to capacitor 13. Resistor 20 thus forms part of the voltage divider including the emitter-collector circuit of transistor 15. If capacitor 13 is charged as stated above, and no further control signal can reach gate 14, a DC current can still flow over resistor 20 to this gate. The amplitude of this current depends on the size of resistor 20 and the resistance of the emitter-collector circuit of transistor 15. However as the battery voltage decreases, the resistance of the emitter-collector circuit of transistor 15 reaches a value which allows sufficient voltage to be applied to gate 14 for triggering thyristor 12. As soon as this is the case of course capacitor 13 discharges and the pulsating DC voltage at the output of rectifier 6 intermittently ignites thyristor 12 via capacitor 13. The charging process, which of course is identical to the charging process described above continues until the voltage determined by the voltage at the variable arm of potentiometer 17 is the required cutoff voltage for the transistor.

While the invention has been illustrated and described as embodied in using specific voltage divider arrangements, it is not intended to be limited to the details shown, since various structural and circuit changes may be made without departing in any way from the spirit of the present invention.

Without further analysis, the foregoing will so fully reveal the gist of the present invention that others can by applying current knowledge readily adapt it for various applications without omitting features that, from the standpoint of prior fairly constitute essential characteristics of the generic or specific aspects of this invention and, therefore such adaptations should and are intended to be comprehended within the meaning and range of equivalence of the following claims.

What is claimed as new and desired to be protected by Letters Patent is set forth in the appended claims:

1. In equipment for charging a battery from an AC source furnishing an AC voltage, in combination, full wave rectifier means for rectifying said AC voltage and furnishing a corresponding pulsating DC voltage at a first and second DC output terminal; electrical switch means having a main conductive circuit connected from said first DC output terminal to said battery and having a switch control electrode, for interrupting the charging current to said battery in response to a cut-off signal at said switch control electrode; a capacitor having a first terminal directly connected to said first DC output terminal and a second terminal directly connected to said switch control electrode; a variable impedance connected from said switch control electrode to said second DC output terminal, said variable impedance having an impedance control electrode, the impedance of said variable impedance varying as a function of the signal applied to said impedance control electrode; and additional circuit means for connecting said impedance control electrode to said battery in such a manner that the signal at said impedance control electrode corresponds only to the voltage across said battery.

2. Equipment as set forth in claim 1, wherein said variable impedance is a transistor having an emitter-collector circuit connected in series with said capacitor and having a base constituting said control electrode.

3. Equipment as set forth in claim 1, wherein said additional circuit means comprise a resistive voltage divider having a voltage divider tap connected to said impedance control electrode.

4. Equipment as set forth in claim 3, wherein said resistive voltage divider comprises at least one resistor having a resistance varying as a function of temperature.

5. Equipment as set forth in claim 1, further comprising a resistor connected in parallel with said capacitor.

* * * * *